United States Patent
Chen et al.

(10) Patent No.: US 12,056,260 B2
(45) Date of Patent: Aug. 6, 2024

(54) METHOD FOR PROTECTING DEVICE SOFTWARE INTEGRITY IN CONTINUITY SCENARIO

(71) Applicant: HUAWEI TECHNOLOGIES CO., LTD., Guangdong (CN)

(72) Inventors: Haiwu Chen, Beijing (CN); Bin Cao, Nanjing (CN); Mengnan Zhang, Shenzhen (CN); Jianying Qian, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 291 days.

(21) Appl. No.: 17/726,605

(22) Filed: Apr. 22, 2022

(65) Prior Publication Data

US 2022/0245286 A1 Aug. 4, 2022

Related U.S. Application Data

(63) Continuation of application No. PCT/CN2019/118937, filed on Nov. 15, 2019.

(30) Foreign Application Priority Data

Oct. 24, 2019 (CN) .......................... 201911018874.9

(51) Int. Cl.
*G06F 21/64* (2013.01)
*H04L 9/32* (2006.01)

(52) U.S. Cl.
CPC .......... *G06F 21/645* (2013.01); *H04L 9/3247* (2013.01); *H04L 9/3268* (2013.01)

(58) Field of Classification Search
CPC ........ G06F 21/645; G06F 21/33; G06F 21/76; H04L 9/3247; H04L 9/3268
See application file for complete search history.

(56) References Cited

U.S. PATENT DOCUMENTS

| 2004/0025036 A1* | 2/2004 | Balard ................. G06F 21/575 |
| | | 713/176 |
| 2005/0246523 A1* | 11/2005 | Mauro ................. H04L 9/3263 |
| | | 713/156 |

(Continued)

FOREIGN PATENT DOCUMENTS

| CN | 102231729 A | 11/2011 |
| CN | 107194237 A | 9/2017 |

OTHER PUBLICATIONS

International Search Report and Written Opinion issued in PCT/CN2019/118937, dated Jul. 22, 2020, 10 pages.

(Continued)

*Primary Examiner* — Henry Tsang

(57) ABSTRACT

A software verification method and apparatus are provided. The method includes: reading flag information, where the flag information is used to indicate a target digital certificate; selecting one of a plurality of digital certificates as a target digital certificate based on the flag information, where the plurality of digital certificates include a first digital certificate and a second digital certificate, and the target digital certificate includes a cryptographic resource; and verifying software deployed on a device based on the cryptographic resource. Using the foregoing technical solution can ensure continuity of the software verification service in the device.

18 Claims, 5 Drawing Sheets

(56) References Cited

U.S. PATENT DOCUMENTS

| | | |
|---|---|---|
| 2008/0209207 A1 | 8/2008 | Parupudi et al. |
| 2010/0017659 A1* | 1/2010 | Dos Remedios ..... G06F 21/575 |
| | | 714/36 |
| 2011/0145568 A1 | 6/2011 | Clement et al. |
| 2017/0295168 A1 | 10/2017 | Wan |
| 2019/0114434 A1 | 4/2019 | Gong et al. |

OTHER PUBLICATIONS

Extended European Search Report issued in EP19950157.8, dated Oct. 7, 2022, 9 pages.

* cited by examiner

METHOD FOR PROTECTING DEVICE SOFTWARE INTEGRITY IN CONTINUITY SCENARIO

CROSS-REFERENCE TO RELATED APPLICATIONS

This application is a continuation of International Application No. PCT/CN2019/118937, filed on Nov. 15, 2019, which claims priority to Chinese Patent Application No. 201911018874.9, filed on Oct. 24, 2019. The disclosures of the aforementioned applications are hereby incorporated by reference in their entireties.

TECHNICAL FIELD

This application relates to the field of software protection, and more specifically, to a method for protecting device software integrity in a continuity scenario.

BACKGROUND

Types of software running on computers become diverse with the popularization of computers in daily production. Once software is tampered with, the software cannot run properly and security of the software is seriously threatened. For secure use of the software, the software needs to be verified using key information.

The key information used for software verification is usually carried in a form of a digital certificate, and the key information is integrity protected. Generally, a digital certificate is issued and maintained by a certificate authority (CA) of a software vendor, and the digital certificate is used to provide a verification service for software deployed on a device. However, if the CA of the software vendor cannot issue or maintain the digital certificate, the digital certificate cannot be used for verifying the software deployed on the device. As a result, the verification service for the software on the device is interrupted.

SUMMARY

Example embodiments of this application provide a method, an apparatus, and a computer-readable storage medium for software verification, to provide a verification service for software deployed on a device, and improve continuity of the verification service for the software on the device.

According to a first aspect, a software verification method is provided. The method includes: reading flag information; selecting one of a plurality of digital certificates as a target digital certificate based on the flag information; and verifying, based on a cryptographic resource included in the target digital certificate, software deployed on a device.

In embodiments of this application, the plurality of digital certificates may include a first digital certificate issued by a first certificate authority (CA) and a second digital certificate issued by a second CA.

It should be understood that the flag information may be a flag field stored in a non-volatile storage unit. The non-volatile storage unit is not specifically limited in embodiments of this application. The non-volatile storage unit may be an electric fuse (EFUSE) chip in a processor, a flash chip, a trusted platform module (TPM), or a nonvolatile random access memory (NVRAM).

It should be further understood that the flag information may be represented in a form of a digital certificate. In other words, the digital certificate includes one or more of the following: the flag information or the cryptographic resource. The cryptographic resource may include but is not limited to: a cryptographic resource for verifying software deployed on the device, and a cryptographic resource for verifying integrity of the plurality of digital certificates.

Optionally, the flag information may also be integrity protected.

The digital certificate may also be stored in a non-volatile storage unit, for example, stored in a FLASH chip.

In the foregoing technical solution, if the first CA can normally provide a service, the first digital certificate issued by the first CA may be used to verify software. If the first CA cannot normally provide a service, the second digital certificate issued by the second CA may be used to verify software, to prevent software to be loaded in the device from being tampered with.

In a possible implementation of the first aspect, the first CA is a CA of a software vendor, and the second CA is a CA of a user or a CA of a third party.

In another possible implementation of the first aspect, the device verifies, based on the cryptographic resource, integrity of the software deployed on the device.

In the foregoing technical solution, integrity of the software deployed on the device may be verified based on the cryptographic resource, to prevent the software from being tampered with.

In another possible implementation of the first aspect, the device may verify integrity of the cryptographic resource in the target digital certificate based on a digital signature included in the target digital certificate.

It should be understood that, to prevent the cryptographic resource in the target digital certificate from being tampered with, the target digital certificate may further include the digital signature. The device may verify integrity of the cryptographic resource in the target digital certificate using the digital signature.

In the foregoing technical solution, digital signaturing is an encryption process, and digital signature verification is a decryption process. The device may determine integrity of the second digital certificate by verifying a digital signature in the second digital certificate.

In another possible implementation of the first aspect, in a scenario in which the second digital certificate is used as the target digital certificate, the target digital certificate may further include a binding identifier (ID). The device may determine, based on the binding identifier (ID), that the device legally owns the second digital certificate.

It should be understood that a binding ID in the second digital certificate is for determining a binding relationship between the second digital certificate and the device, to verify validity of the second digital certificate. In other words, it is determined, based on the binding ID in the second digital certificate, that the device legally owns the second digital certificate.

In another possible implementation of the first aspect, the device may determine validity of the cryptographic resource in the target digital certificate based on a correspondence between the binding identifier (ID) in the target digital certificate and a binding identifier (ID) in the device.

In an example embodiment, the second digital certificate includes a binding ID, and a processor chip of the device also includes a binding ID. Data comparison is performed between the binding ID in the second digital certificate and the binding ID in the processor chip, to determine whether the device legally owns the second digital certificate. If the binding ID in the second digital certificate is the same as the binding ID in the processor chip, it may be determined that the second digital certificate is legally owned by the device.

In embodiments of this application, the processor chip may be an EFUSE chip in a processor, a trusted platform module (TPM), or a nonvolatile random access memory (NVRAM).

It should be understood that the binding ID in the processor chip is unique, that is, binding IDs on different processor chips are different. Therefore, it may be determined whether the device legally owns the second digital certificate by comparing whether the binding ID in the second digital certificate matches the binding ID in the processor chip.

In another possible implementation of the first aspect, the binding identifier (ID) may include a basic unit and an extension unit, and the basic unit is associated with the device.

In an example, the binding ID includes the basic unit and the extension unit. To be specific, in the foregoing comparison of whether the binding ID in the second digital certificate matches the binding ID in the processor chip, it needs to determine whether components in basic units match with each other and whether components in extension units match with each other in the binding IDs.

The basic unit is unique, and each processor has a different basic unit. The extension unit is used for extending functions, and an initial value of the extension unit is 0. When the device handles an exception, for example, the second digital certificate is revoked or the device is returned to the factory for repair and then re-delivered, a value of the extension unit may be modified. In this way, if the basic unit and the extension unit in the second digital certificate are respectively the same as the basic unit and the extension unit in the processor chip, it may be determined that the second digital certificate is legally owned by the device.

In the foregoing technical solution, the binding identifier (ID) may include the basic unit and the extension unit, and the basic unit features uniqueness and randomness, to ensure that basic units of processors are different from each other. The extension unit may be for extending functions, to support abnormal scenarios such as digital certificate revocation and device repair and re-delivery.

In another possible implementation of the first aspect, the cryptographic resource includes public key information for verifying the software and/or hash value information of the software.

The cryptographic resource in the digital certificate contains cryptographic parameters for verifying the integrity of the software deployed and running on the device. For example, the cryptographic resource in the digital certificate contains a hash value of running software, public key information for verification, and a message authentication code.

It should be understood that a public key and a private key are a key pair obtained using an algorithm. The public key is a public part of the key pair, and the private key is a non-public part. The public key is usually used to encrypt a session key, verify a digital signature, or encrypt data that can be decrypted using the corresponding private key. Such a key pair obtained using an algorithm is globally unique. When the key pair is used, if a piece of data is encrypted with either the public or the private key and then needs to be decrypted with the other key. For example, if data is encrypted with the public key, the data needs to be decrypted with the private key; if data is encrypted with the private key, the data needs to be decrypted with the public key. Otherwise, decryption will fail.

In the foregoing technical solution, if the software on the device is encrypted with the private key, decryption needs to be performed with the public key corresponding to the private key, to determine integrity of the software and prevent the software from being tampered with.

According to a second aspect, a software verification apparatus is provided, including:

a reading module, configured to read flag information, where the flag information is used to indicate a target digital certificate;

a determining module, configured to select one of a plurality of digital certificates as the target digital certificate based on the flag information, where the plurality of digital certificates include a first digital certificate and a second digital certificate, the first digital certificate is issued by a first certificate authority (CA), the second digital certificate is issued by a second CA, and the target digital certificate includes a cryptographic resource; and a verification module, configured to verify, based on the cryptographic resource, software deployed on a device.

In a possible implementation of the second aspect, the first CA is a CA of a software vendor, and the second CA is a CA of a user or a CA of a third party.

In another possible implementation of the second aspect, the verification module is further configured to verify, based on the cryptographic resource, integrity of the software deployed on the device.

In another possible implementation of the second aspect, the target digital certificate further includes a digital signature, and the verification module is further configured to verify integrity of the cryptographic resource in the target digital certificate based on the digital signature.

In another possible implementation of the second aspect, the second digital certificate is used as the target digital certificate, and the target digital certificate further includes a binding identifier (ID); and the verification module is further configured to verify validity of the cryptographic resource in the target digital certificate based on the binding identifier (ID) in the target digital certificate.

In another possible implementation of the second aspect, the verification module is further configured to determine validity of the cryptographic resource in the target digital certificate based on a correspondence between the binding identifier (ID) in the target digital certificate and a binding identifier (ID) in the device.

In another possible implementation of the second aspect, the binding identifier (ID) includes a basic unit and an extension unit, and the basic unit is associated with the device.

In another possible implementation of the second aspect, the cryptographic resource includes public key information for verifying the software and/or hash value information of the software.

Advantageous effects of any one of the second aspect or the possible implementations of the second aspect correspond to advantageous effects of any one of the first aspect or the possible implementations of the first aspect.

According to a third aspect, a device is provided, including a processor and a memory. The memory is configured to store a computer program, and the processor is configured to invoke the computer program from the memory and run the computer program, so that the device performs the method according to any one of the first aspect or the possible implementations of the first aspect.

Optionally, during specific implementation, a quantity of processors is not limited. The processor may be a general-purpose processor, and may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

According to a fourth aspect, a computer program product is provided. The computer program product includes computer program code. When the computer program code is run on a computer, the computer is enabled to perform the method according to any one of the first aspect or the possible implementations of the first aspect.

According to a fifth aspect, a computer-readable storage medium is provided. The computer-readable storage medium stores computer program code. When the computer program code is run on a computer, the computer is enabled to perform the method according to any one of the first aspect or the possible implementations of the first aspect. The computer-readable storage media includes but is not limited to one or more of the following: a read-only memory (ROM), a programmable ROM (PROM), an erasable PROM (EPROM), a Flash memory, electrically EPROM (EEPROM), or hard drive.

According to a sixth aspect, a chip is provided. The chip includes a processor and a data interface. The processor reads, through the data interface, instructions or program code stored in a memory, to perform the method according to any one of the first aspect or the possible implementations of the first aspect. In an example implementation process, the chip may be a central processing unit (CPU), a micro controller unit (MCU), a microprocessor (MPU), a digital signal processor (DSP), a system on chip (SoC), an application-specific integrated circuit (ASIC), a field programmable gate array (FPGA), or a programmable logic device (PLD).

DESCRIPTION OF EMBODIMENTS

The following describes technical solutions of this application with reference to the accompanying drawings.

With the popularization of computers in daily production, there are various kinds of software running on computers. Once the software is tampered with, the software cannot run properly and security of the software is seriously threatened. For secure use of the software, the software needs to be verified using key information.

The key information used for software verification is usually carried in a form of a digital certificate, and the key information is integrity protected. It should be understood that the digital certificate is secure electronic authentication. Digital certificates are used for identity identification and electronic information encryption in the Internet, or enterprise's intranet or external network. A digital certificate contains identification information of an owner of a key pair (a public key and a private key). An identity of the owner of the certificate is authenticated by verifying the identification information.

Generally, a digital certificate is issued and maintained by a certificate authority (CA) of a software vendor, and the digital certificate is used to provide a verification service for software deployed on a device. However, if the CA of the software vendor cannot issue or maintain the digital certificate, the digital certificate cannot be used for verifying the software deployed on the device. As a result, the verification service for the software on the device is interrupted.

According to the technical solutions provided in embodiments of this application, in a scenario in which a CA of a software vendor cannot issue or maintain a digital certificate, a verification service can still be provided for software deployed on a device, to ensure continuity of a software verification service in the device.

The following describes in detail, with reference to FIG. 1 to FIG. 9, method embodiments provided in embodiments of this application.

It should be understood that the method provided in embodiments of this application may be applied to the foregoing device, and the device may be a board with any function. For example, the device may be a processor board, an input and output (I/O) board, and a power board.

Figure 1:
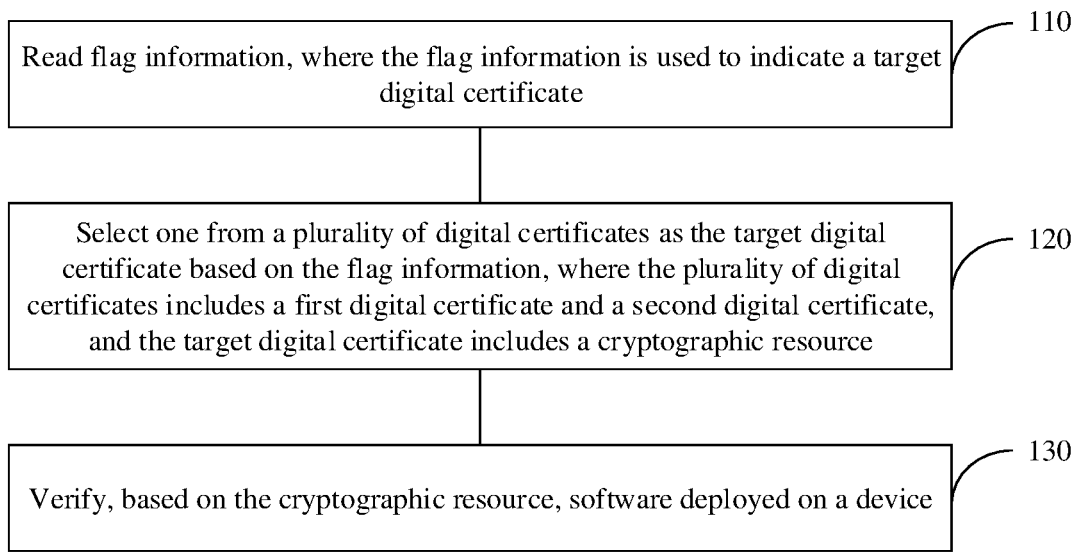
FIG. 1 is a schematic flowchart of a software verification method according to an embodiment of this application.

FIG. 1 is a schematic flowchart of a software verification method according to an embodiment of this application. The method shown in FIG. 1 may include steps 110 to 130. The following separately describes steps 110 to 130 in detail.

Step 110: Read flag information, where the flag information is used to indicate a target digital certificate.

The flag information may be a flag field stored in a non-volatile storage unit, or may be represented in a form of a digital certificate. In other words, the digital certificate includes one or more of the following: the flag information or a cryptographic resource. The cryptographic resource may include but is not limited to: a cryptographic resource for verifying software deployed on a device, and a cryptographic resource for verifying integrity of a plurality of digital certificates.

Optionally, the flag information may also be integrity protected.

The non-volatile storage unit is not specifically limited in embodiments of this application. In a possible implementation, the non-volatile storage unit is memory space, for example, an electric fuse (EFUSE) chip or a flash (FLASH) chip in a processor. In another possible implementation, the non-volatile storage unit is a security chip, for example, a trusted platform module (TPM) or a nonvolatile random access memory (NVRAM).

It should be understood that the FLASH chip is a type of memory device, and is a non-volatile memory. FLASH chips can still persistently retain data without current supply. This storage feature is similar to the storage feature of hard disks. The FLASH chips have become storage media of various portable digital devices by virtue of this feature. The FLASH chip may include but is not limited to: an erasable programmable read-only memory (EPROM), a card, a stick, a key driver, or the like.

It should be further understood that the security chip uses security technologies for commercial users. The security chip advantageously provides highly reliable encryption processing for data stored in the security chip, to prevent the data from being theft.

The flag information may be modified manually or through software triggering. For example, the device may modify, based on computer instructions or program code entered by a user, a flag field stored in the non-volatile storage unit.

Step 120: Select one of the plurality of digital certificates as the target digital certificate based on the flag information, where the plurality of digital certificates include a first digital certificate and a second digital certificate, and the target digital certificate includes the cryptographic resource.

In embodiments of this application, a plurality of digital certificates may be stored in the device, and the plurality of digital certificates are stored in a non-volatile storage unit, for example, stored in a FLASH chip. The plurality of digital certificates include the first digital certificate issued by a first CA and the second digital certificate issued by a second CA.

Optionally, in some embodiments, the first CA is a CA of a software vendor, and the second CA is a CA of a user or a CA of a third party.

It should be noted that, if a software vendor and a hardware vendor are a same manufacturer, the first CA is a CA of the manufacturer. If a software vendor and a hardware vendor are different manufacturers, the first CA is a CA of the software vendor.

The device may select, from the plurality of digital certificates based on the flag information, the target digital certificate indicated by the flag information, where the target digital certificate includes the cryptographic resource.

Step 130: Verify, based on the cryptographic resource, the software deployed on the device.

After determining the target digital certificate, the device may verify, based on the cryptographic resource in the digital certificate, the software deployed and run on the device. For example, the cryptographic resource includes any one or more of the following: public key information for verification or a code hash value of running software. The device may verify, based on the cryptographic resource, integrity of the software deployed on the device.

In this embodiment, if the CA of the software vendor can normally maintain and issue a digital certificate, integrity of software is verified using a certificate issued by the CA of the software vendor. If an emergency occurs to the software vendor, integrity of software is verified using a certificate issued by the CA of the third party or the CA of the user. In this way, the service of verifying integrity of software on the device is not interrupted, to ensure service continuity in the device.

For ease of description, the following provides descriptions by using an example of verifying integrity of software.

Figure 2:
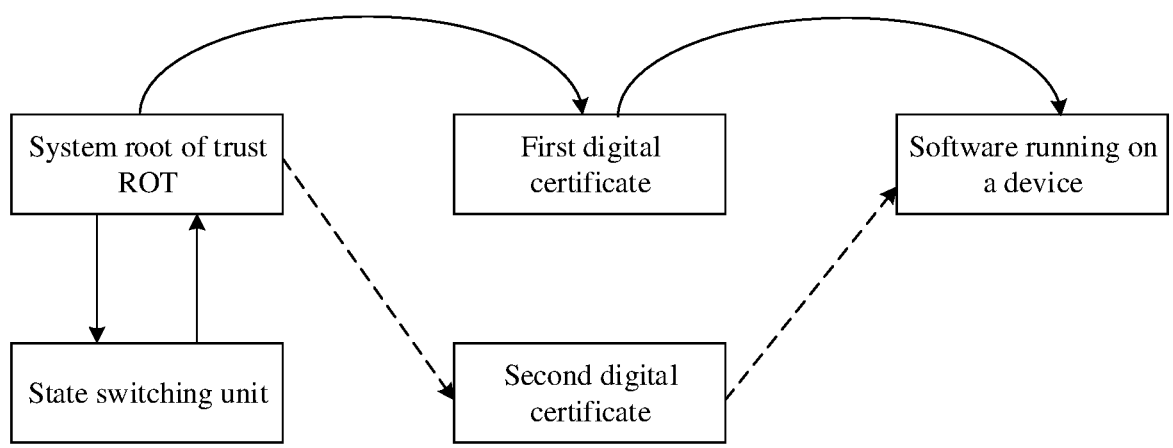
FIG. 2 is a schematic block diagram of a software verification method according to an embodiment of this application.

For example, as shown in FIG. 2, a device stores a first digital certificate (which is, for example, issued by a certificate authority (CA) of a software vendor) and a second digital certificate (which is, for example, issued by a CA of a third party or a CA of a user). A root of trust (RoT) in the device may determine a startup path based on a state of a state switching unit. For example, in a scenario in which the state switching unit indicates that the CA of the software vendor can issue and maintain a digital certificate, the root of trust may select the first digital certificate based on the state information of the state switching unit, and verify, based on the first digital certificate, integrity of software running on the device. For another example, in a scenario in which the state switching unit indicates that the CA of the software vendor cannot normally issue or maintain a digital certificate, the root of trust may select the second digital certificate based on the state information of the state switching unit, and verify, based on the second digital certificate, integrity of software running on the device.

It should be understood that, after the device is powered on, the first segment of executable program loaded by a processor in the device is considered as the root of trust of a system. A chain of trust starts with the root of trust in device startup and software verification, and the integrity of the root of trust is strictly protected by hardware.

The state switching unit is not specifically limited in this embodiment of this application. In a possible implementation, the state switching unit is a flag field stored in the non-volatile storage unit. In another possible implementation, the state switching unit is a digital certificate stored in the non-volatile storage unit, and the digital certificate includes one or more of the following: flag information or a cryptographic resource. The cryptographic resource may include but is not limited to: a cryptographic resource for verifying software deployed on the device, or a cryptographic resource for verifying integrity the foregoing plurality of digital certificates (for example, the first digital certificate and the second digital certificate). For specific descriptions of the flag field, refer to the foregoing descriptions.

Optionally, the flag information may also be integrity protected.

After the root of trust runs, the root of trust may select a corresponding digital certificate based on a state of the state switching unit, and verifies software to be loaded at a next level based on the selected digital certificate. It should be understood that the state switching unit is configured to indicate that the device is in a "common service" scenario or a "service continuity" scenario.

For example, if the flag information in the state switching unit indicates the "common service" scenario, the root of trust selects the first digital certificate issued by the certificate authority (CA) of the software vendor, and verifies integrity of the software deployed on the device based on a cryptographic resource (for example, public key information, or a hash value of running software) in the first digital certificate.

The "common service" scenario may be understood as a scenario in which the CA of the software vendor can issue and maintain a digital certificate.

For another example, if the flag information in the state switching unit indicates the "service continuity" scenario, the root of trust selects the second digital certificate issued by the CA of the third party or the CA of the user, and verifies integrity of the software deployed on the device based on a cryptographic resource (for example, public key information, or a hash value of running software) in the second digital certificate.

"Service continuity" is to ensure that critical service functions of a device continue to run properly in case of emergencies of an enterprise (for example, a software vendor) according to a set of management requirements and processes of service rules, without causing service interruption or essential change of the service process.

The "service continuity" scenario may be understood as a scenario in which a CA of a software vendor cannot issue or maintain a digital certificate due to emergencies. In this scenario, to continue to provide a software integrity protection service for a user, the software vendor provides the second digital certificate issued by the CA of the third party or the CA of the user. The root of trust may verify integrity of the software deployed on the device based on the cryptographic resource (for example, the public key information, or the hash value of running software) in the second digital certificate. This can implement continuity of the critical service functions in the device, without causing service interruption or essential change of the service process.

Figure 3:
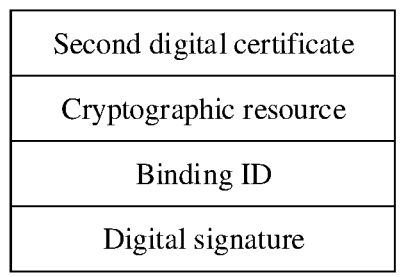
FIG. 3 is a schematic block diagram of a second digital certificate according to an embodiment of this application.

The following describes in detail specific content in the second digital certificate in this embodiment of this application with reference to FIG. 3.

It should be understood that a format of the second digital certificate may be defined by the X.509 standard or may be user-defined. FIG. 3 lists example content of a possible second digital certificate.

As shown in FIG. 3, the second digital certificate may include any one or more of the following: a cryptographic resource, a binding identifier (ID), or a digital signature.

(1) Cryptographic Resource

The cryptographic resource in the second digital certificate includes a cryptographic parameter for verifying integrity of software deployed and run on a device. For example, the cryptographic resource in the second digital certificate includes a hash value of running software, public key information for verification, and a message authentication code.

It should be understood that a public key and a private key are a key pair (one public key and one private key) obtained using an algorithm. The public key is a public part of the key pair, and the private key is a non-public part. The public key is usually used to encrypt a session key, verify a digital signature, or encrypt data that can be decrypted using the corresponding private key. Such a key pair obtained using an algorithm is globally unique. When the key pair is used, if a piece of data is encrypted with either the public or the private key and then needs to be decrypted with the other key. For example, if data is encrypted with the public key, the data needs to be decrypted with the private key; if data is encrypted with the private key, the data needs to be decrypted with the public key. Otherwise, decryption will fail.

If the software on the device is encrypted with the private key, decryption needs to be performed with the public key corresponding to the private key, to determine integrity of the software and prevent the software from being tampered with.

(2) Binding ID

The binding ID in the second digital certificate is for determining a binding relationship between the second digital certificate and the device, to verify validity of the second digital certificate. In other words, it is determined, based on the binding ID in the second digital certificate, that the device legally owns the second digital certificate.

In some embodiments, the second digital certificate includes a binding ID, and a processor chip of the device also includes a binding ID. Data comparison is performed between the binding ID in the second digital certificate and the binding ID in the processor chip, to determine whether the device legally owns the second digital certificate. If the binding ID in the second digital certificate is the same as the binding ID in the processor chip, it may be determined that the second digital certificate is legally owned by the device.

It should be understood that the binding ID in the processor chip is unique, that is, binding IDs on different processor chips are different. Therefore, it may be determined whether the device legally owns the second digital certificate by comparing whether the binding ID in the second digital certificate matches the binding ID in the processor chip.

Figure 4:
FIG. 4 is a schematic block diagram of a binding ID according to an embodiment of this application.

In an example, the binding ID in embodiments of this application is shown in FIG. 4, and includes a basic unit and an extension unit. To be specific, in the foregoing example comparison of whether the binding ID in the second digital certificate matches the binding ID in the processor chip, it needs to determine whether components in basic units match with each other and whether components in extension units match with each other in the binding IDs.

The basic unit is unique, and each processor has a different basic unit. The extension unit is used for extending functions, and an initial value of the extension unit is 0. When the device handles an exception, for example, the second digital certificate is revoked or the device is returned to the factory for repair and then re-delivered, a value of the extension unit may be modified. In this way, if the basic unit and the extension unit in the second digital certificate are respectively the same as the basic unit and the extension unit in the processor chip, it may be determined that the second digital certificate is legally owned by the device.

(3) Digital Signature

The digital signature in the second digital certificate is used to ensure integrity of the second digital certificate and prevent the second digital certificate from being tampered with.

It should be understood that the digital signature is a digital string, which cannot be forged and is generated by only an information sender. The digital string is also an effective proof for authenticity of information sent by the information sender. Similar to a common physical signature written on paper, the digital signature is implemented using technologies in the public key encryption field, and is used to authenticate digital information. A set of digital signatures usually defines two complementary operations, one for signing and the other for verification. The digital signature is application of an asymmetric key encryption technology and a digital digest technology. When sending a packet, a sender generates a packet digest from the packet text using a hash function, and then encrypts the digest using a public key of a peer end, where the encrypted digest, as a digital signature of the packet, is sent to the receiver together with the packet. The receiver first calculates a packet digest from the received original packet using a hash function same as the hash function used by the sender, and then decrypts the digital signature attached to the packet using a private key of the receiver. If the two digests are the same, the receiver determines that the digital signature belongs to the sender. A digital signature represents a feature of a file. If the file changes, a value of the digital digest accordingly changes.

Different digital digests may be obtained for different files. One digital signature involves one hash function, a receiver's public key, and a receiver's private key.

Digital signaturing is an encryption process, and digital signature verification is a decryption process. In this embodiment, integrity of the second digital certificate is determined by verifying the digital signature in the second digital certificate.

Figure 5:
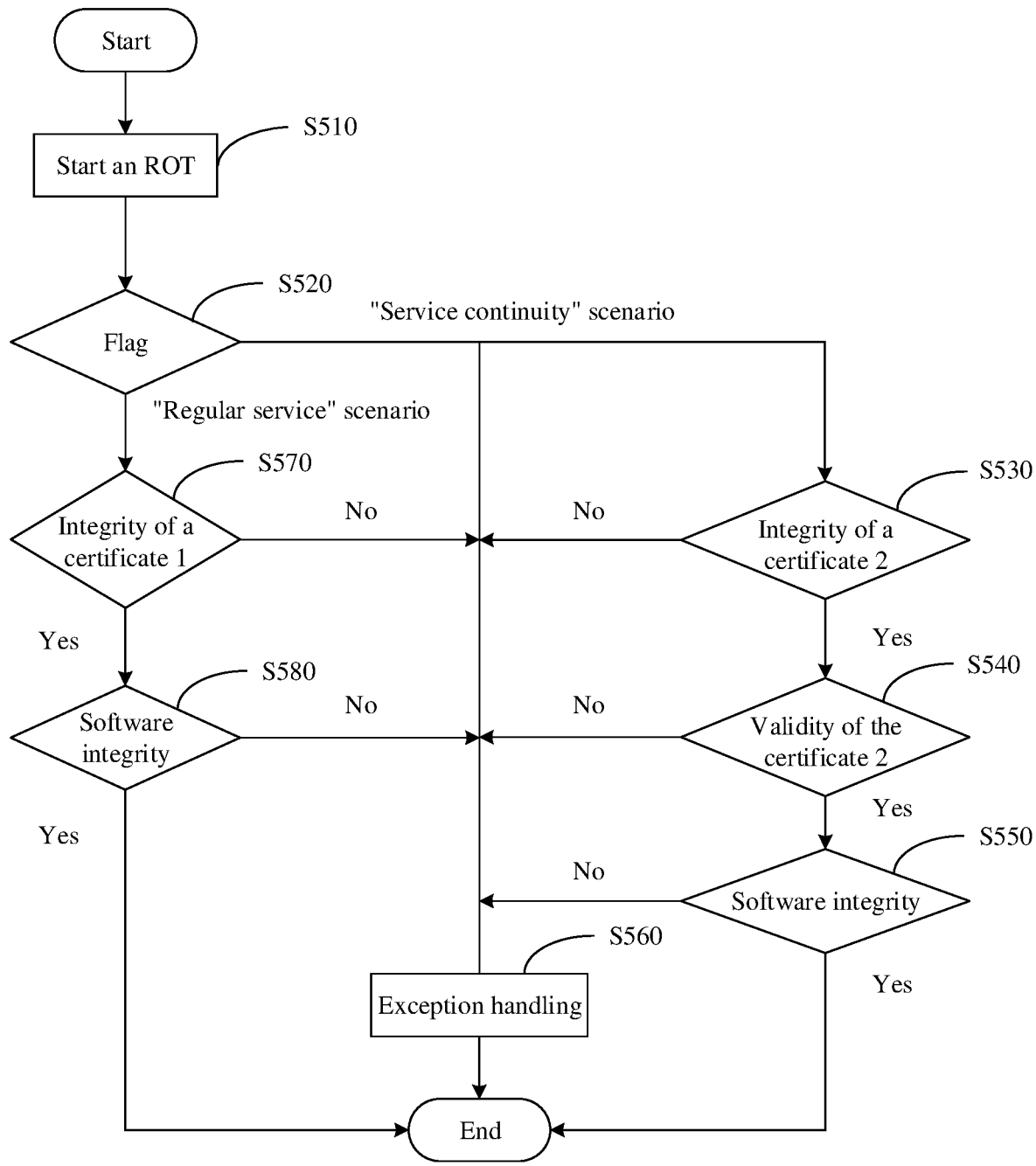
FIG. 5 is a schematic flowchart of another software verification method according to an embodiment of this application.

With reference to FIG. 5, the following describes in detail an example implementation process of a software verification method provided in an embodiment of this application by using an example of verifying integrity of software. It should be understood that the example shown in FIG. 5 is merely intended to help a person skilled in the art understand this embodiment of this application, instead of limiting this embodiment to a specific value or a specific scenario in the example. It is clearly that a person skilled in the art can make various equivalent modifications or changes based on the example provided in FIG. 5, and such modifications and changes also fall within the scope of embodiments of this application.

FIG. 5 is a schematic flowchart of a software integrity protection method according to an embodiment of this application. The method shown in FIG. 5 may include steps 510 to 590. The following separately describes steps 510 to 590 in detail.

It should be understood that a certificate 2 in FIG. 5 corresponds to the foregoing second digital certificate. The second digital certificate is, for example, issued by a CA of a third party or a CA of a user. A certificate 1 in FIG. 5 corresponds to the foregoing first digital certificate, and the first digital certificate is, for example, issued by a certificate authority (CA) of a software vendor.

The certificate 1, the certificate 2, and software deployed and running on a device may be stored in a FLASH chip.

Step 510: Start a RoT.

After the device is powered on, a processor loads a program. The first segment of executed program code is generally considered as a root of trust RoT of the device, which is a program first executed after the device is powered on.

Step 520: The RoT reads flag information.

The RoT reads a stored flag field. In a possible implementation, the flag field is stored in a non-volatile storage unit. In another possible implementation, the flag field may alternatively be represented in a form of a digital certificate. In other words, the digital certificate includes one or more of the following: the flag information or a cryptographic resource.

The following provides description by using an example in which the flag field is stored in a non-volatile storage unit.

Figure 6:
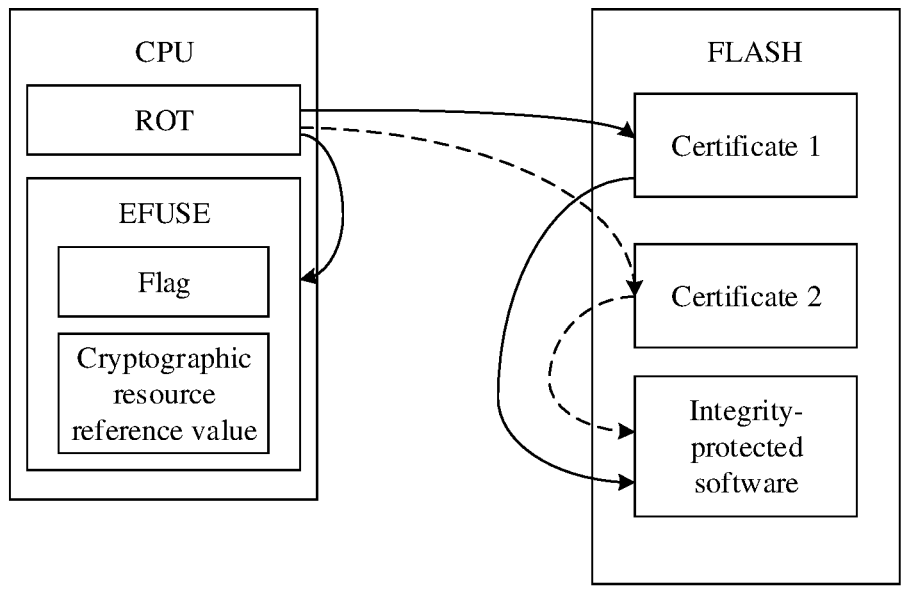
FIG. 6 is a schematic block diagram of a possible software integrity protection scenario according to an embodiment of this application.

For example, refer to FIG. 6. The flag field is stored in an EFUSE chip of a processor, and the RoT reads the flag field from the EFUSE.

It should be understood that the processor in this embodiment of this application may be a central processing unit (CPU), another general-purpose processor, a reduced instruction set computing (RISC) processor, a complex instruction set computing (CISC) processor, a digital signal processor (DSP), an application-specific integrated circuits (ASIC), a field programmable gate array (FPGA) or another programmable logic device, a discrete gate or transistor logic device, a discrete hardware component, or the like.

Figure 7:
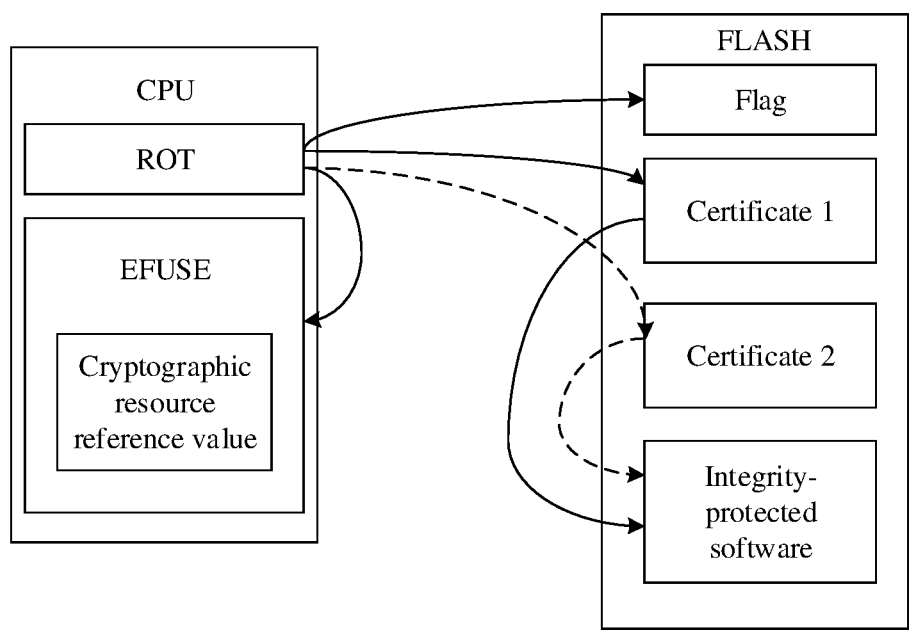
FIG. 7 is a schematic block diagram of another possible software integrity protection scenario according to an embodiment of this application.

For another example, refer to FIG. 7. The flag field is stored in a FLASH chip, and the RoT reads the flag field from the FLASH chip.

Figure 8:
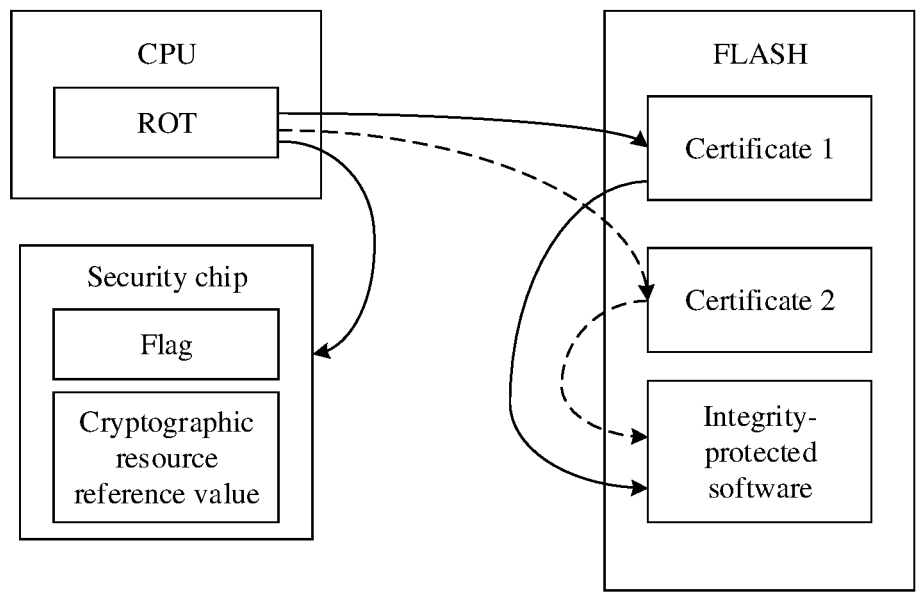
FIG. 8 is a schematic block diagram of another possible software integrity protection scenario according to an embodiment of this application.

For another example, refer to FIG. 8. The flag field is stored in a security chip (for example, a TPM or an NVRAM), and the RoT reads the flag field from the security chip.

If the flag field indicates a "service continuity" scenario, the RoT may perform steps 530 to 560. If the flag field indicates a "common service" scenario, the RoT may perform steps 560 to 580.

Step 530: The RoT determines integrity of the certificate 2.

According to the "service continuity" scenario indicated by the flag field, the RoT may obtain the certificate 2 and verify integrity of the certificate 2. There are a plurality of specific implementations. In a possible implementation, the RoT may determine integrity of the certificate 2 based on a digital signature in the certificate 2. In another possible implementation, the RoT may alternatively verify integrity of the certificate 2 based on the cryptographic resource in the digital certificate that includes the flag information.

The following provides descriptions by using an example in which the RoT determines integrity of the certificate 2 based on the digital signature in the certificate 2.

For example, refer to FIG. 6. The RoT reads the flag field from the EFUSE, where the flag field indicates a "service continuity" scenario. The RoT reads the certificate 2 from the FLASH chip, where the certificate 2 may include any one or more of the following: a cryptographic resource, a binding identifier (ID), or a digital signature. The RoT may determine integrity of the certificate 2 based on the digital signature.

For another example, refer to FIG. 7. The RoT reads the flag field from the FLASH chip, where the flag field indicates a "service continuity" scenario. The RoT reads the certificate 2 from the FLASH chip, where the certificate 2 may include any one or more of the following: a cryptographic resource, a binding identifier (ID), or a digital signature. The RoT may determine integrity of the certificate 2 based on the digital signature.

For another example, refer to FIG. 8. The RoT reads the flag field from a security chip, where the flag field indicates a "service continuity" scenario. The RoT reads the certificate 2 from the FLASH chip, where the certificate 2 may include any one or more of the following: a cryptographic resource, a binding identifier (ID), or a digital signature. The RoT may determine integrity of the certificate 2 based on the digital signature.

For specific descriptions about the digital signature, refer to the descriptions in FIG. 3.

If the RoT determines that the certificate 2 has integrity, the RoT may perform step 540; otherwise, the RoT performs step 560.

Step 540: The RoT determines validity of the certificate 2.

The RoT may read a cryptographic resource reference value, where the cryptographic resource reference value may include a binding ID. The RoT may compare the binding ID included in the certificate 2 with the binding ID included in the cryptographic resource reference value. If the binding ID in the certificate 2 is the same as the binding ID in the cryptographic resource reference value, the RoT may determine that the digital certificate 2 is legally owned by the device. If the binding ID in the certificate 2 is different from the binding ID in the cryptographic resource reference value, the RoT may determine that the certificate 2 is illegally owned by the device.

The cryptographic resource reference value may be stored in a non-volatile storage unit. The non-volatile storage unit may be an EFUSE chip in the processor, or may be a security chip, for example, a TPM or an NVRAM.

For example, refer to FIG. 6. The cryptographic resource reference value is stored in the EFUSE. The RoT reads the certificate 2 from the FLASH chip, where the certificate 2 may include any one or more of the following: a cryptographic resource, a binding identifier (ID), or a digital signature. The RoT reads the cryptographic resource reference value from the EFUSE, and compares the binding ID included in the cryptographic resource reference value with the binding ID included in the certificate 2, to determine validity of the certificate 2.

For another example, refer to FIG. 8. The cryptographic resource reference value is stored in the security chip (for example, the TPM or the NVRAM). The RoT reads the certificate 2 from the FLASH chip, where the certificate 2 may include any one or more of the following: a cryptographic resource, a binding identifier (ID), or a digital signature. The RoT reads the cryptographic resource reference value from the security chip (for example, the TPM or the NVRAM), and compares a binding ID included in the cryptographic resource reference value with a binding ID included in the certificate 2, to determine validity of the certificate 2.

For specific descriptions about the binding ID, refer to the descriptions in FIG. 3.

If determining that the certificate 2 is legally owned by the device, the RoT may perform step 550; otherwise, the RoT performs step 560.

It should be noted that there is no sequence between step 530 and step 540. Step 530 may be performed before or after step 540, or the two steps may be performed at the same time. This is not limited in embodiments of this application.

Step 550: The RoT determines integrity of software according to the certificate 2.

The RoT may verify, based on the cryptographic resource included in the certificate 2, integrity of software deployed and run on the device.

Figure 9:
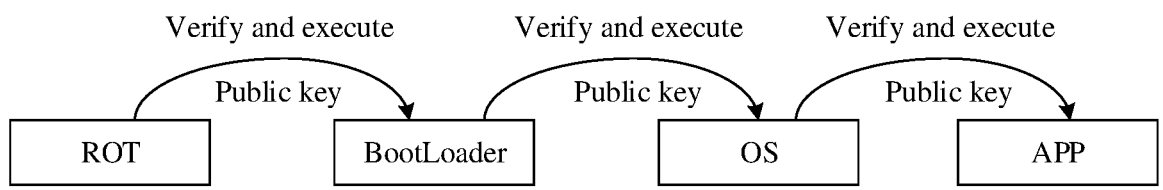
FIG. 9 is a schematic block diagram of a software integrity verification method according to an embodiment of this application.

For example, as shown in FIG. 9, the RoT verifies a digital signature of a bootloader based on public key information included in the cryptographic resource. After the BootLoader is successfully verified, the RoT loads the BootLoader. The BootLoader verifies a digital signature of an operating system (OS) using the public key information. After the OS is successfully verified, the BootLoader loads the OS. The OS verifies an application (APP) using the public key information. After the APP is successfully verified, the OS is responsible for loading the APP, to complete the process of integrity verification for the application.

Step 560: The RoT performs exception handling.

Step 570: The RoT determines integrity of the certificate 1.

According to the "common service" scenario indicated by the flag field, the RoT may obtain the certificate 1 and verify integrity of the certificate 1. There are a plurality of specific implementations. In a possible implementation, the RoT may determine integrity of the certificate 1 based on a digital signature in the certificate 1. In another possible implementation, the RoT may alternatively verify integrity of the certificate 1 based on a cryptographic resource in the digital certificate that includes the flag information.

The following provides descriptions by using an example in which the RoT determines integrity of the certificate 1 based on the digital signature in the certificate 1.

For example, refer to FIG. 6. The RoT reads the flag field from the EFUSE, where the flag field indicates a "common service" scenario. The RoT reads the certificate 1 from the FLASH chip, where the certificate 1 may include any one or more of the following: a cryptographic resource or a digital signature. The RoT may determine integrity of the certificate 1 based on the digital signature.

For another example, refer to FIG. 7. The RoT reads the flag field from the FLASH chip, where the flag field indicates a "common service" scenario. The RoT reads the certificate 1 from the FLASH chip, where the certificate 1 may include any one or more of the following: a cryptographic resource or a digital signature. The RoT may determine integrity of the certificate 1 based on the digital signature.

For another example, refer to FIG. 8, the RoT reads the flag field from the security chip, where the flag field indicates a "common service" scenario. The RoT reads the certificate 1 from the security chip, where the certificate 1 may include any one or more of the following: a cryptographic resource or a digital signature. The RoT may determine integrity of the certificate 1 based on the digital signature.

For specific descriptions about the digital signature, refer to the descriptions in FIG. 3.

Step 580: The RoT determines integrity of the software according to the certificate 1.

The RoT may verify, based on the cryptographic resource included in the certificate 1, integrity of software deployed and run on the device. For an example verification process, refer to the description in step 550.

It should be understood that, in various embodiments of this application, sequence numbers of the foregoing processes do not mean execution sequences. The execution sequences of the processes should be determined based on functions and internal logic of the processes, and should not constitute any limitation on the implementation processes of embodiments of this application.

It should be further understood that these steps or operations are merely examples, and other operations or variations of various operations may be further performed in embodiments of this application. In addition, the steps may be performed in different sequences presented in the foregoing embodiments, and not all operations in the foregoing embodiments may be performed.

The foregoing describes in detail the software verification method provided in embodiments of this application with reference to FIG. 1 to FIG. 9. The following describes in detail apparatus embodiments of this application with reference to FIG. 10 and FIG. 11. It should be understood that the descriptions of the method embodiments correspond to the descriptions of the apparatus embodiments. Therefore, for parts that are not described in detail, refer to the foregoing method embodiments.

Figure 10:
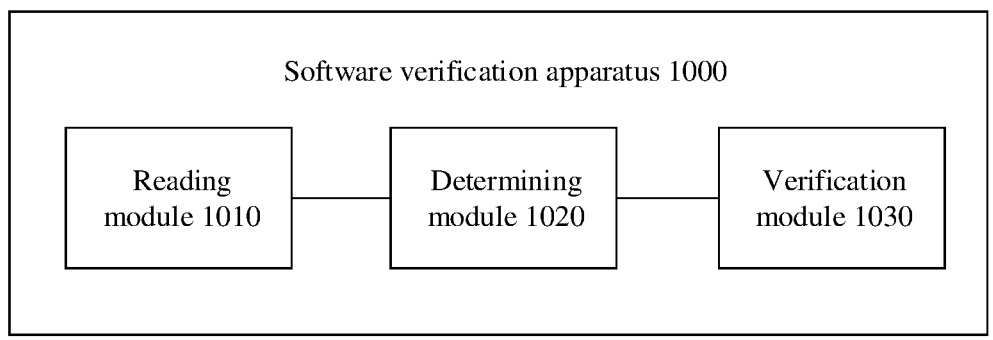
FIG. 10 is a schematic diagram of a structure of a software verification apparatus 1000 according to an embodiment of this application.
Figure 11:
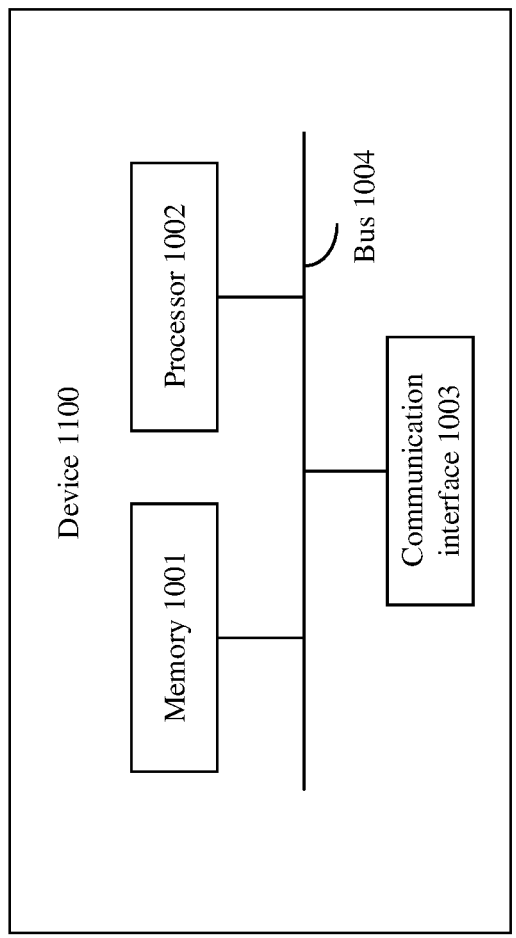
FIG. 11 is a schematic diagram of a structure of a device 1100 according to an embodiment of this application.

The following describes apparatus embodiments provided in this application with reference to FIG. 10 and FIG. 11.

It should be noted that the apparatus embodiments are implementations of the solutions of this application considered from the perspective of products and devices, and the apparatus embodiments of this application correspond to or complement some content of the foregoing described method embodiments of this application. The apparatus embodiments are also applicable to implementation of the solution and the support for the scope of the claims.

FIG. 10 is a schematic diagram of a structure of a software verification apparatus 1000 according to an embodiment of this application. It should be understood that the software verification apparatus 1000 shown in FIG. 10 is merely an example, and the apparatus in this embodiment of this application may alternatively include another module or unit. It should be understood that the software verification apparatus 1000 can perform the steps in the methods in FIG. 1 to FIG. 9.

As shown in FIG. 10, the software verification apparatus 1000 may include:

a reading module 1010, configured to read flag information, where the flag information is used to indicate a target digital certificate;

a determining module 1020, configured to select one of a plurality of digital certificates as the target digital certificate based on the flag information, where the plurality of digital certificates include a first digital certificate and a second digital certificate, the first digital certificate is issued by a first CA, the second digital certificate is issued by a second CA, and the target digital certificate includes a cryptographic resource; and a verification module 1030, configured to verify, based on the cryptographic resource, software deployed on a device.

Optionally, in a possible implementation, the first CA is a CA of a software vendor, and the second CA is a CA of a user or a CA of a third party.

Optionally, in another possible implementation, the verification module 1030 is further configured to:

verify, based on the cryptographic resource, integrity of the software deployed on the device.

Optionally, in another possible implementation, the target digital certificate further includes a digital signature; and the verification module 1030 is further configured to verify integrity of the cryptographic resource in the target digital certificate based on the digital signature.

Optionally, in another possible implementation, the second digital certificate is used as the target digital certificate, and the target digital certificate further includes a binding identifier (ID); and the verification module 1030 is further configured to verify validity of the cryptographic resource in the target digital certificate based on the binding identifier (ID) in the target digital certificate.

Optionally, in another possible implementation, the verification module 1030 is further configured to determine validity of the cryptographic resource in the target digital certificate based on a correspondence between the binding identifier (ID) in the target digital certificate and a binding identifier (ID) in the device.

Optionally, in another possible implementation, the binding identifier (ID) includes a basic unit and an extension unit, and the basic unit is associated with the device.

Optionally, in another possible implementation, the cryptographic resource includes public key information for verifying the software and/or hash value information of the software.

It should be understood that the software verification apparatus 1000 herein is implemented in a form of functional modules. The term "module" herein may be implemented in a form of software and/or hardware. This is not specifically limited herein. For example, the "module" may be a software program, a hardware circuit, or a combination thereof that implements the foregoing functions. When any one of the foregoing modules is implemented using software, the software exists in a manner of computer program instructions or program code, and is stored in a memory. A processor may be configured to execute the program instructions or the program code to implement the foregoing method procedure. The processor may include but is not limited to at least one of the following computing devices that run software: a central processing unit (CPU), a microprocessor, a digital signal processor (DSP), a microcontroller (MCU), an artificial intelligence processor. Each computing device may include one or more cores for executing software instructions or program code for operations or processing. The processor may be an independent semiconductor chip, or may be integrated into a semiconductor chip together with another circuit. For example, the processor may form a system on chip (SoC) together with another circuit (for example, a codec circuit, a hardware acceleration circuit, or various buses and interface circuits). Alternatively, the processor may be integrated into an application-specific integrated circuit (ASIC) as a built-in processor of the ASIC, and the ASIC integrating the processor may be separately packaged or may be packaged with another circuit. In addition to a core for executing software instructions or program code to for operations or processing, the processor may further include a necessary hardware accelerator, for example, a field programmable gate array (FPGA), a programmable logic device (PLD), or a logic circuit that implements a dedicated logic operation.

When the foregoing modules are implemented using a hardware circuit, the hardware circuit may be implemented using a general-purpose central processing unit (CPU), a micro controller unit (MCU), a microprocessor (MPU), a digital signal processor (DSP), or a system on chip (SoC). Certainly, the hardware circuit may alternatively be implemented using an application-specific integrated circuit (ASIC) or a programmable logic device (PLD). The PLD may be a complex programmable logic device (CPLD), a field programmable gate array (FPGA), a generic array logic (GAL), or any combination thereof, provided that the hardware circuit can run necessary software or execute the foregoing method procedure without depending on software.

FIG. 11 is a schematic diagram of a structure of a device 1100 according to an embodiment of this application. The device 1100 includes a memory 1101, a processor 1102, a communication interface 1103, and a bus 1104. The memory 1101, the processor 1102, and the communication interface 1103 implement mutual communication connections through the bus 1104.

The memory 1101 may be a read-only memory (ROM), a static storage device, a dynamic storage device, or a random access memory (RAM). The memory 1101 may store a program. When the program stored in the memory 1101 is executed by the processor 1102, the processor 1102 is configured to perform the steps of the software verification method in embodiments of this application, for example, the steps in embodiments shown in FIG. 1 to FIG. 9.

The processor 1102 may be a general-purpose central processing unit (CPU), a microprocessor, an application-specific integrated circuit (ASIC), or one or more integrated circuits. The processor 1102 is configured to execute a related program, to implement the software verification method in the method embodiments of this application.

Alternatively, the processor 1102 may be an integrated circuit chip capable of signal processing. In an implementation process, the steps of the software verification method in embodiments of this application may be implemented using a hardware integrated logical circuit in the processor 1102, or using instructions or program code in a form of software.

The processor 1102 may be alternatively a general-purpose processor, a digital signal processor (DSP), an application-specific integrated circuit (ASIC), a programmable gate array (FPGA) or another programmable logic device, a discrete gate or transistor logic device, or a discrete hardware component. The processor may implement or perform the methods, the steps, and the logical block diagrams disclosed in embodiments of this application. The general-purpose processor may be a microprocessor, or the processor may be any conventional processor or the like.

The steps of the methods disclosed with reference to embodiments of this application may be directly implemented by a hardware decoding processor, or may be implemented using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1101. The processor 1102 reads information from the memory 1101, and completes, in combination with hardware of the processor 1102, functions that need to be performed by units included in the device 1100 in embodiments of this application, or performs the software verification method in the method embodiments of this application. For example, the processor 1102 performs steps/functions in the embodiments shown in FIG. 1 to FIG. 9.

The communication interface 1103 may be implemented, but not limited to, using a transceiver apparatus such as a transceiver, to implement communication between the device 1100 and another device or a communication network.

The bus 1104 may provide a path for transmitting information between components (for example, the memory 1101, the processor 1102, and the communication interface 1103) in the device 1100.

It should be understood that, the processor in embodiments of this application may be a central processing unit (CPU), or may be another general-purpose processor, a digital signal processor (DSP), an application-specific integrated circuit (ASIC), a field programmable gate array (FPGA), another programmable logic device, discrete gate or transistor logic device, discrete hardware component, or the like. The general-purpose processor may be a microprocessor, or the processor may be any conventional processor or the like.

It may be understood that the memory in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium, or the like. The semiconductor medium may be a solid state drive.

It should be understood that the term "and/or" in this specification describes only an association relationship between associated objects and represents that three relationships may exist. For example, A and/or B may represent the following three cases: only A exists, both A and B exist, and only B exists. A and B may be singular or plural. In addition, the character "/" in this specification usually represents an "or" relationship between the associated objects, or may represent an "and/or" relationship. A specific meaning depends on a context.

In the present disclosure, "at least one" means one or more, and "a plurality of" means two or more. "At least one of the following items (pieces)" or a similar expression thereof refers to any combination of these items, including any combination of singular items (pieces) or plural items (pieces). For example, at least one item (piece) of a, b, and c may indicate: a, b, c, a and b, a and c, b and c, or a, b, and c, where a, b, and c may be singular or plural.

It should be understood that, in various embodiments of this application, sequence numbers of the foregoing processes do not mean execution sequences. The execution sequences of the processes should be determined based on functions and internal logic of the processes, and should not constitute any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenient and brief description, reference may be made to a corresponding process in the method embodiments for a detailed working process of the system, apparatus, and unit.

In the several embodiments provided in this application, it should be understood that the disclosed system, apparatus, and method may be implemented in another manner. For example, the described apparatus embodiment is merely an example. For example, the unit division is merely logical function division or may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in this application essentially, or a part contributing to an existing technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes any medium that can store program code, such as a USB flash drive, a removable hard disk drive, a read-only memory (ROM), a random access memory (RAM), a magnetic disk, or an optical disc.

The foregoing descriptions are merely non-limiting examples of specific implementations of this application, but are not intended to limit the protection scope of this application, which is intended to cover any variation or replacement readily determined by a person of ordinary skill in the art. Therefore, the claims shall define the protection scope.

What is claimed is:

1. A software verification method, comprising:
reading flag information, wherein the flag information indicates a target digital certificate;
selecting one of a plurality of digital certificates as the target digital certificate based on the flag information, wherein the plurality of digital certificates comprise a first digital certificate and a second digital certificate, the first digital certificate is issued by a first certificate authority (CA), the second digital certificate is issued by a second CA, and the target digital certificate comprises a cryptographic resource; and
verifying, based on the cryptographic resource, software deployed on a device.

2. The method according to claim 1, wherein the first CA is a CA of a software vendor, and the second CA is a CA of a user or a CA of a third party.

3. The method according to claim 1, wherein the verifying, based on the cryptographic resource, software deployed on a device comprises:
verifying, based on the cryptographic resource, integrity of the software deployed on the device.

4. The method according to claim 1, wherein the target digital certificate further comprises a digital signature, and the method further comprises:
verifying integrity of the cryptographic resource in the target digital certificate based on the digital signature.

5. The method according to claim 1, wherein the second digital certificate is used as the target digital certificate, and the target digital certificate further comprises a binding identifier (ID); and
wherein the method further comprises:
verifying validity of the cryptographic resource in the target digital certificate based on the binding identifier (ID) in the target digital certificate.

6. The method according to claim 5, wherein the verifying validity of the cryptographic resource in the target digital certificate based on the binding identifier (ID) in the target digital certificate comprises:
determining validity of the cryptographic resource in the target digital certificate based on a correspondence between the binding identifier (ID) in the target digital certificate and a binding identifier (ID) in the device.

7. The method according to claim 6, wherein the binding identifier (ID) comprises a basic unit and an extension unit, and the basic unit is associated with the device.

8. The method according to claim 1, wherein the cryptographic resource comprises public key information for verifying the software and/or hash value information of the software.

9. A device, comprising at least one processor and a memory coupled with the at least one processor, wherein the memory comprising instructions that, when executed by the at least one processor, cause the device to:
read flag information, wherein the flag information indicates a target digital certificate;
select one of a plurality of digital certificates as the target digital certificate based on the flag information, wherein the plurality of digital certificates comprise a first digital certificate and a second digital certificate, the first digital certificate is issued by a first certificate authority (CA), the second digital certificate is issued by a second CA, and the target digital certificate comprises a cryptographic resource; and
verify, based on the cryptographic resource, software deployed on the device.

10. The device according to claim 9, wherein the first CA is a CA of a software vendor, and the second CA is a CA of a user or a CA of a third party.

11. The device according to claim 9, wherein the instructions, when executed by the at least one processor, further cause the device to:
verify, based on the cryptographic resource, integrity of the software deployed on the device.

12. The device according to claim 9, wherein the target digital certificate further comprises a digital signature, and the instructions, when executed by the at least one processor, further cause the device to:
verify integrity of the cryptographic resource in the target digital certificate based on the digital signature.

13. The device according to claim 9, wherein the second digital certificate is used as the target digital certificate, and the target digital certificate further comprises a binding identifier (ID), and the instructions, when executed by the at least one processor, further cause the device to:
verify validity of the cryptographic resource in the target digital certificate based on the binding identifier (ID) in the target digital certificate.

14. The device according to claim 13, wherein the instructions, when executed by the at least one processor, further cause the device to:
  determine validity of the cryptographic resource in the target digital certificate based on a correspondence between the binding identifier (ID) in the target digital certificate and a binding identifier (ID) in the device.

15. The device according to claim 14, wherein the binding identifier (ID) comprises a basic unit and an extension unit, and the basic unit is associated with the device.

16. The device according to claim 9, wherein the cryptographic resource comprises public key information for verifying the software and/or hash value information of the software.

17. A chip, comprising at least one processor and a data interface, and the at least one processor reads, through the data interface, instructions stored in a memory, to perform operations comprising:
  reading flag information, wherein the flag information indicates a target digital certificate;
  selecting one of a plurality of digital certificates as the target digital certificate based on the flag information, wherein the plurality of digital certificates comprise a first digital certificate and a second digital certificate, the first digital certificate is issued by a first certificate authority (CA), the second digital certificate is issued by a second CA, and the target digital certificate comprises a cryptographic resource; and
  verifying, based on the cryptographic resource, software deployed on a device.

18. The chip according to claim 17, wherein the second digital certificate is used as the target digital certificate, and the target digital certificate further comprises a binding identifier (ID); and
  wherein the operations further comprise verifying validity of the cryptographic resource in the target digital certificate based on the binding identifier (ID) in the target digital certificate.

* * * * *